(12) United States Patent
Olivan Bescos

(10) Patent No.: US 9,965,838 B2
(45) Date of Patent: May 8, 2018

(54) CALIPER FOR MEASURING OBJECTS IN AN IMAGE

(75) Inventor: Javier Olivan Bescos, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1015 days.

(21) Appl. No.: 12/678,497

(22) PCT Filed: Sep. 4, 2008

(86) PCT No.: PCT/IB2008/053580
§ 371 (c)(1),
(2), (4) Date: Mar. 17, 2010

(87) PCT Pub. No.: WO2009/037611
PCT Pub. Date: Mar. 26, 2009

(65) Prior Publication Data
US 2010/0215245 A1    Aug. 26, 2010

(30) Foreign Application Priority Data

Sep. 17, 2007  (EP) ..................................... 07116530

(51) Int. Cl.
| G06K 9/32 | (2006.01) |
| G06T 7/00 | (2017.01) |
| G06T 3/00 | (2006.01) |

(52) U.S. Cl.
CPC .............. *G06T 7/00* (2013.01); *G06T 3/0006* (2013.01); *G06T 7/0012* (2013.01);
(Continued)

(58) Field of Classification Search
None
See application file for complete search history.

(56) References Cited

U.S. PATENT DOCUMENTS

| 5,622,170 A | 4/1997 | Schulz |
| 6,278,767 B1 | 8/2001 | Hsieh |
| (Continued) | | |

FOREIGN PATENT DOCUMENTS

| JP | 05042134 | 2/1993 |
| JP | 2004305236 A | 11/2004 |
| (Continued) | | |

OTHER PUBLICATIONS

Radpix, Help Menu, http://www.radpix.com/help/index.htm, last updated Jan. 2005.*

(Continued)

*Primary Examiner* — Mark Roz

(57) ABSTRACT

The invention relates to a user interface (300) for measuring an object viewed in an image computed from image data, the user interface comprising an image unit (310) for visualizing the image data in the image, a deployment unit (320) for deploying a caliper (21) in an image data space, a scaling unit (330) for scaling the caliper (21) by a scaling factor in a direction in the image data space, a translation unit (340) for translating the caliper (21) in the image data space, and a caliper unit (350) for visualizing the caliper (21) in the image, wherein the caliper (21) comprises a knot for measuring the object, and wherein the object is measured based on the scaling factor. The caliper (21) comprising the knot, which determines the shape of the caliper (21), is a simple reference object of known geometry and size. Looking at the image data and the caliper (21) visualized in the image, the user may easily place the caliper (21) in the image data space and adjust its size to match the size of the measured object. Unlike the prior art methods, which are based on selecting two points and measuring the distance between them, there is no need to change the view of the image data in order to place and/or adjust the size of the caliper (21). Therefore, the caliper (21) of the invention typically reduces the amount of (Continued)

manual interactions needed to measure the object. Advantageously, the caliper (21) of the invention also enhances the visual experience of the user. The size of the caliper (21) may be isotropically or anisotropically adjusted, i.e. in one or more directions, by rotating a mouse wheel, while the mouse translations may determine the location of the caliper (21) in the viewing plane.

12 Claims, 8 Drawing Sheets

(52) U.S. Cl.
CPC ...... *G06T 2200/04* (2013.01); *G06T 2200/24* (2013.01); *G06T 2207/30101* (2013.01)

(56) References Cited

U.S. PATENT DOCUMENTS

| | | | |
|---|---|---|---|
| 7,113,617 | B2 | 9/2006 | Kimmel et al. |
| 2004/0249270 | A1* | 12/2004 | Kondo ............... G06T 15/08 600/425 |
| 2005/0008205 | A1 | 1/2005 | Kiraly et al. |
| 2005/0188309 | A1 | 8/2005 | Tasker et al. |
| 2006/0251308 | A1 | 11/2006 | Grosskopf et al. |
| 2007/0014447 | A1 | 1/2007 | Hubschmann |
| 2010/0215245 | A1 | 8/2010 | Bescos |

FOREIGN PATENT DOCUMENTS

| | | |
|---|---|---|
| WO | 03075209 A2 | 9/2003 |
| WO | 2005116923 A1 | 12/2005 |
| WO | 2006055251 A2 | 5/2006 |

OTHER PUBLICATIONS

RadPix, selected pages from Help menu, last updated Jan. 2005.*
Photoshop Elliptical Marquee Tool Tutorial, from www.simplephotoshop.com, available Dec. 2003.*
Bob McFarlane, Modelling with Autocad 2004, Elsevier 2004.*
Koschan et al: "Finding Objects in a 3D Environment by Combining Distance Measurement and Color Indexing"; Proceedings of the IEEE International Conference on Image Processing ICIP2001, IEEE, vol. 1, pp. 858-861.
He et al: "Generation of Transfer Functions With Stochastic Search Techniques"; Proceedings of the 7th IEEE Visualization Conference (VIS'96), 1996, pp. 227-234.
Foley et al: "Computer Graphics: Principles and Practice"; Addison-Wesley Publishing Company, 1996, Chapter 18.
Iconico: "Screen Calipers"; Online Advertisement for an On-Screen Caliper, Retrieved From the Internet At www.iconico.com/caliper/indesx.aspx, Jul. 12, 2007.

* cited by examiner

CALIPER FOR MEASURING OBJECTS IN AN IMAGE

FIELD OF THE INVENTION

The invention relates to the field of medical imaging and, more specifically, to measuring structures viewed in medical images.

BACKGROUND OF THE INVENTION

Clinical applications traditionally involve image data, which needs to be analyzed and interpreted. Based on interpretation of the image data, a physician can make a diagnosis and advise a treatment suitable for a patient. Proper interpretation of an image computed from the image data often requires measuring objects describing anatomical and pathological structures visualized in the image. To this end, the physician needs a tool which allows her/him to assess the diameter of a blood vessel or the size of a tumor, for example. In most applications, to measure an object, the user determines two points in a three-dimensional image data space, hereinafter referred to as 3D points, and the application is arranged to calculate the distance between these 3D points. A line segment connecting the determined 3D points may be displayed.

Unfortunately, it is not always possible to accurately determine two points on the surface of a measured structure such as a blood vessel, for example. This is because the surface, on which a point is to be selected, is typically perpendicular to the viewing plane. FIG. 1 illustrates the problem of the prior art method. The goal is to measure the diameter of the blood vessel 11. Two points, connected by a line segment 12, are selected on the two opposite edges in the rendered image of the blood vessel. The diameter of the vessel 11 is typically underestimated, as shown on the zoomed-in vessel segment 13.

To overcome this problem, in current applications, the user needs to make edges in the rendered image of the blood vessel clearly visible. This is achieved by positioning the blood vessel in the image to make the first edge visible and determining the first point. Then the user repositions the vessel to make the second edge visible and determines the second point. Alternatively, the user can zoom in the vessel, select the two points, and zoom out the vessel to its original position. Unfortunately, these operations require extra user interaction to measure the blood vessel. A further problem is that the drawn line segment may be not aligned perpendicularly to the vessel axis, as it should be.

To measure objects visualized in two-dimensional images, an on-screen caliper may be used. An implementation of such a caliper is offered on-line by Inico at http://www.iconico.com/caliper/index.aspx, retrieved Jul. 12, 2007. This caliper, however, obstructs the view of structures visualized in an image.

SUMMARY OF THE INVENTION

It would be advantageous to have a system that requires less user interaction without compromising accuracy of the measurement.

To better address this issue, in an aspect of the invention, a user interface for measuring an object viewed in an image computed from image data is provided, the user interface comprising:

an image unit for visualizing the image data in the image for displaying on a display;

a deployment unit for deploying a caliper in an image data space;

a scaling unit for scaling the caliper by a scaling factor in a direction in the image data space;

a translation unit for translating the caliper in the image data space; and a caliper unit for visualizing the caliper in the image; wherein the caliper comprises a knot for measuring the object, and wherein the object is measured based on the scaling factor.

The phrase "the caliper comprises a knot" should be interpreted to mean that the knot is a distinguishable component of the caliper. The knot may be a circle—the simplest knot. The caliper may be the circle, a disc defined by the circle, or a spherical cap of a given curvature bordered by the circle. An introduction to the mathematics of knots can be found in an article published at http://en.wikipedia.org/wiki/Knot_ (mathematics), retrieved Jul. 12, 2007. It is also possible that the caliper comprises a knot for measuring the object and another structural or functional element, e.g., the caliper may comprise a circle, a line segment with both ends on the circle, and/or a rotation axis perpendicular to the plane of the circle and crossing this plane at a point inside the circle. In another embodiment, the caliper may comprise two concentric circles of different radiuses.

The caliper comprising the knot, which determines the shape of the caliper, is a simple reference object of known geometry and size. Looking at the image data and the caliper visualized in the image, the user may easily place the caliper in the image data space and adjust the size of the caliper to match the size of the measured object. Unlike the prior art methods, which are based on selecting two points and measuring the distance between them, there is no need to change the view of the image data in order to place and/or adjust the size of the caliper. Therefore, the caliper of the invention typically reduces the amount of manual interactions needed to measure the object. Advantageously, the caliper of the invention may improve the visual experience of the user.

In an embodiment, the user interface further comprises a rotation unit for rotating the caliper in the image data space. The rotation unit allows rotating the caliper, such as an ellipse, for example. The rotation may be defined as a planar rotation in the viewing plane, with one degree of freedom parameterized, e.g., by an azimuthal angle, or as a three-dimensional rotation in the image data space, with three degrees of freedom parameterized, e.g., by three Euler angles. The additional degrees of freedom allow to better position the caliper relative to the viewed object.

In an embodiment of the user interface, the knot is an unknot. An unknot is a circle continuously embedded in the three-dimensional (3D) image data space modeled by the 3D Euclidean space, for example. Examples of unknots comprise, but are not limited to, a circle, the edge of a square, and an ellipse. A caliper comprising an unknot is easy to manipulate and its position in the image data space is easy to comprehend by a user.

In an embodiment of the user interface, the knot is substantially planar. Planar knots, e.g., a circle, are still easier to manipulate and understand by the user than non-planar unknots.

In an embodiment of the user interface, the image data and the caliper are rendered using the perspective projection method. In the perspective projection method, the size and/or the shape of the caliper depend on the location of the caliper in the 3D image data space to match the structures visualized in the image computed from the image data.

In an embodiment of the user interface, the knot is a circle. Advantageously, the circle is isotropic with respect to rotations in the circle plane about the centre. Thus, translations are completely sufficient to place the circle at a desired location when the circle plane and the viewing plane are substantially parallel.

In an embodiment, the user interface is used for measuring the diameter of a blood vessel. Measuring vessel diameters with the caliper of the invention is easier than using a prior art caliper.

In a further aspect of the invention, the user interface according to the invention is comprised in an image acquisition apparatus.

In a further aspect of the invention, the user interface according to the invention is comprised in a workstation.

In a further aspect of the invention, a method of measuring an object viewed in an image computed from image data is provided, the method comprising:

an image step for visualizing the image data in the image for displaying on a display;

a deployment step for deploying a caliper in an image data space;

a scaling step for scaling the caliper by a scaling factor in a direction in the image data space;

a translation step for translating the caliper in the image data space; and a caliper step for visualizing the caliper in the image;

wherein the caliper comprises a knot for measuring the object and wherein the object is measured based on the scaling factor.

In a further aspect of the invention, a computer program product to be loaded by a computer arrangement is provided, the computer program product comprising instructions for measuring an object viewed in an image computed from image data, the computer arrangement comprising a processing unit and a memory, the computer program product, after being loaded, providing said processing unit with the capability to carry out the following tasks:

visualizing the image data in the image for displaying on a display;

deploying a caliper in an image data space;

scaling the caliper by a scaling factor in a direction in the image data space;

translating the caliper in the image data space; and visualizing the caliper in the image;

wherein the caliper comprises a knot for measuring the object and wherein the object is measured based on the scaling factor.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the user interface, can be carried out by a skilled person on the basis of the present description.

The skilled person will appreciate that the user interface may be applied to view reports comprising multidimensional image data, e.g., 2-dimensional, 3-dimensional, or 4-dimensional images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), Digital Tomosynthesis, and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
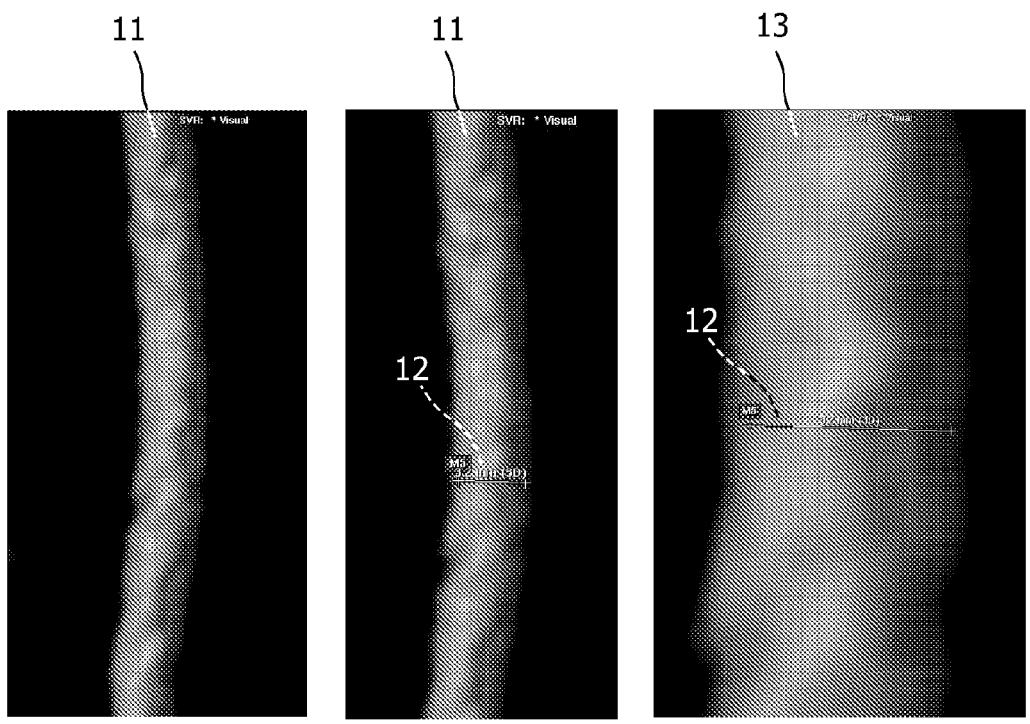
FIG. 1 illustrates the problem of the prior art caliper.
Figure 2:
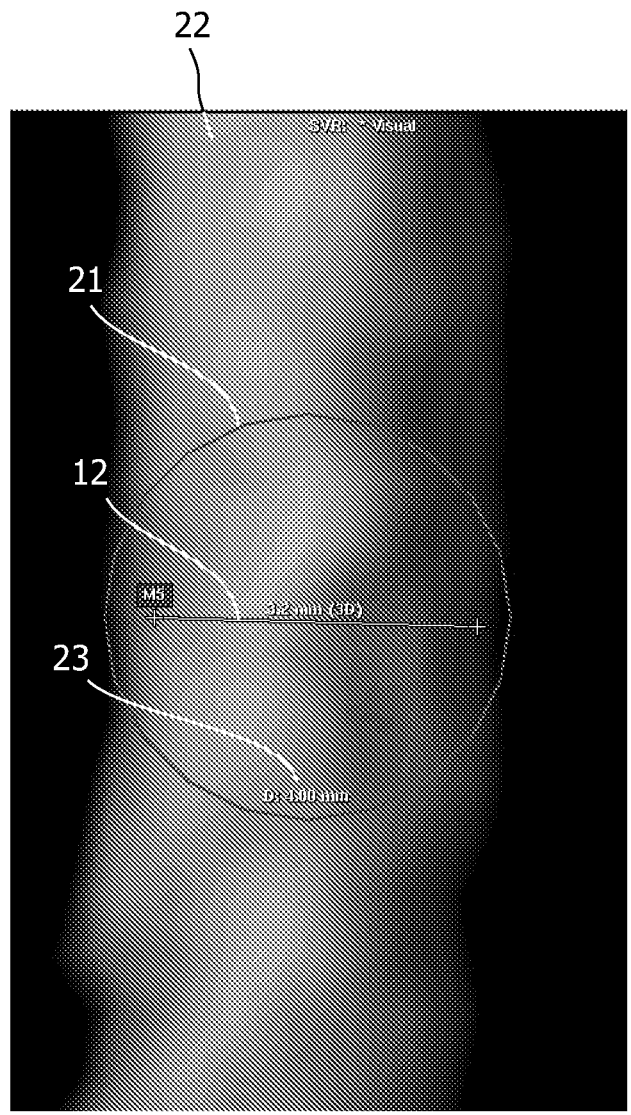
FIG. 2 illustrates an embodiment of the caliper of the invention.

FIG. 2 illustrates an embodiment of the caliper of the invention. Here the caliper 21 is a knot—a planar circle. The caliper 21 is used to measure the diameter of a blood vessel 22. After placing the caliber, the length 23 of the diameter of the circle is displayed.

In an embodiment of the user interface, the size of the caliper 21 is adjusted by rotating a mouse wheel. There are two speeds for changing the size of the caliper 21. When the user presses and rotates the mouse wheel, the speed is high. The size of the caliper 21 changes in steps of 4 mm. When the user rotates the mouse wheel without pressing it, the speed is low and the size of the caliper 21 changes in steps of 0.5 mm. The same scaling method with other speeds may be implemented in further embodiments. During this scaling, the center of the circle does not move.

Alternatively, in an embodiment, the user may select any point on the display as the scaling center. When the selected point is not at the center of the circle, rotating the mouse wheel will result in scaling the circle. The center of the circle translates along the line joining the selected point and the circle center. The ratio of the distance between the center of the scaled circle and the selected point to the distance between the center of the circle before scaling and the selected point is equal to the scaling factor.

To translate the circle in the horizontal direction, the user uses the "drag and drop" operation of the mouse: he/she places the mouse pointer inside the circle, presses a mouse button and then moves the mouse while pressing the mouse button. The mouse pointer moves on the screen and "drags" the circle. When the user releases the mouse button, the circle is "dropped", i.e., released, in its current location. The caliper 21 provides more accurate measurements with less manual interaction.

In an embodiment, the user interface 300 comprises a "caliper on" button. After the user presses and activates the caliper by pressing the button, the caliper becomes attached to the mouse pointer. When the user moves the mouse, the mouse pointer and the caliper move accordingly. The user may release the caliper in a desired location by pressing a mouse button.

The skilled person will understand that there are many possible embodiments of the caliper 21. For example, the shape of the caliper 21 may be different, e.g., the knot comprised in the caliper 21 may be the edge of a square, an ellipse, a non-planar closed curve topologically equivalent to a circle, or a trefoil knot. In an embodiment, the knot is determined based on a user input. Further, the caliper 21 may be a surface bounded by the knot. Such a surface may be defined, for example, as a union of all intervals whose first end is a pre-defined point on the knot and whose second end is another point on the knot. Alternatively, the knot may be mapped by a one-to-one continuous map, whose inverse is also continuous, on a surface. A part of the surface bounded by the mapped knot may be the caliper. All these embodiments illustrate the invention and should not be construed as limiting the scope of the claims.

Figure 3:
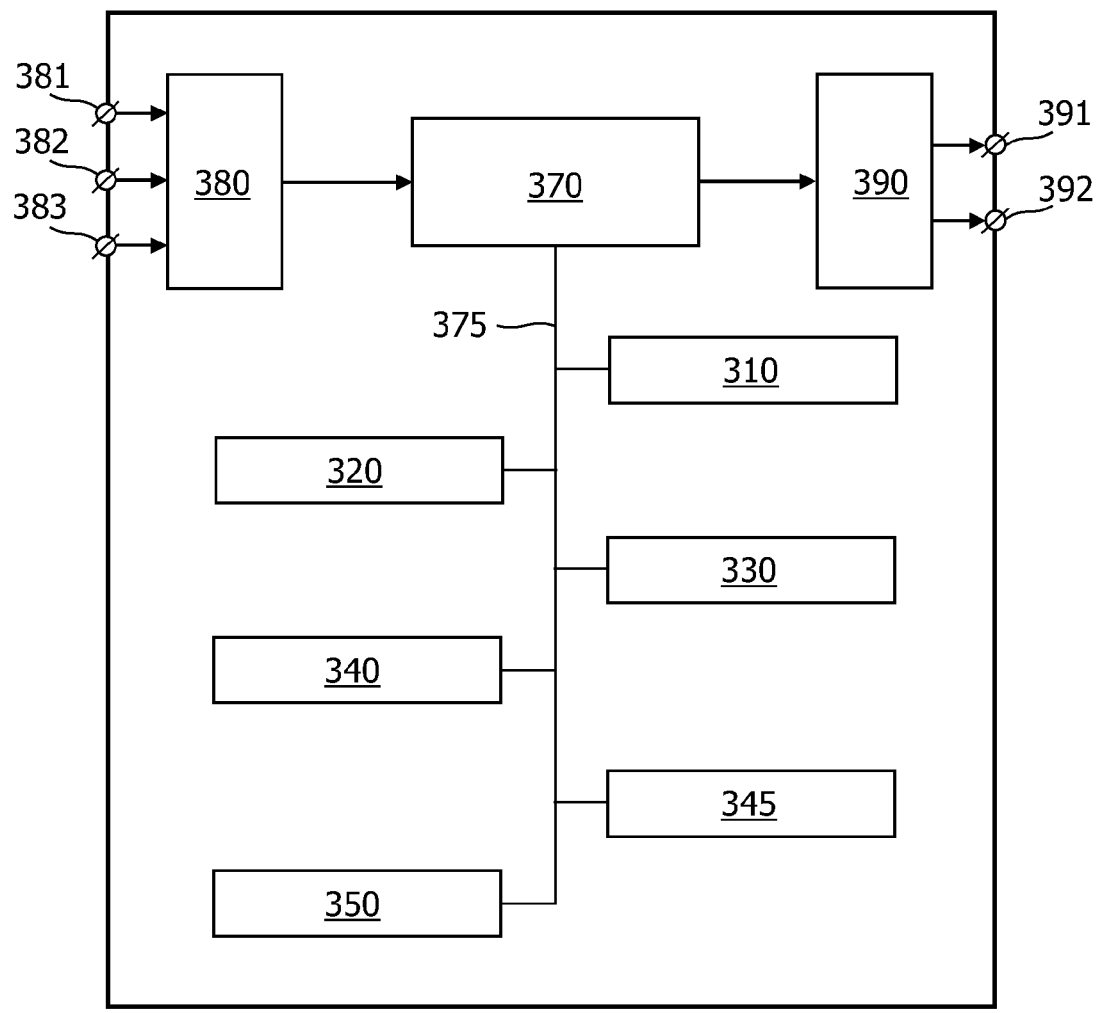
FIG. 3 schematically shows a block diagram of an exemplary embodiment of the user interface.

FIG. 3 schematically shows a block diagram of an exemplary embodiment of the user interface 300 for measuring an object viewed in an image computed from image data, the user interface comprising:

an image unit 310 for visualizing the image data in the image for displaying on a display;

a deployment unit 320 for deploying a caliper 21 in an image data space;

a scaling unit 330 for scaling the caliper 21 by a scaling factor in a direction in the image data space;

a translation unit 340 for translating the caliper 21 in the image data space; and a caliper unit 350 for visualizing the caliper in the image; wherein the caliper 21 comprises a knot for measuring the object and wherein the object is measured based on the scaling factor.

The exemplary embodiment of the user interface 300 further comprises the following units:

a rotation unit 345 for rotating the caliper 21 in the image data space; and a memory unit 370 for storing data.

In an embodiment of the user interface 300, there are three input connectors 381, 382 and 383 for the incoming data. The first input connector 381 is arranged to receive data coming in from a data storage means such as, but not limited to, a hard disk, a magnetic tape, a flash memory, or an optical disk. The second input connector 382 is arranged to receive data coming in from a user input device such as, but not limited to, a mouse or a touch screen. The third input connector 383 is arranged to receive data coming in from a user input device such as a keyboard. The input connectors 381, 382 and 383 are connected to an input control unit 380.

In an embodiment of the user interface 300, there are two output connectors 391 and 392 for the outgoing data. The first output connector 391 is arranged to output the data to a data storage means such as a hard disk, a magnetic tape, a flash memory, or an optical disk. The second output connector 392 is arranged to output the data to a display device. The output connectors 391 and 392 receive the respective data via an output control unit 390.

The skilled person will understand that there are many ways to connect input devices to the input connectors 381, 382 and 383 and the output devices to the output connectors 391 and 392 of the user interface 300. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the user interface 300, the user interface 300 comprises a memory unit 370. The user interface 300 is arranged to receive input data from external devices via any of the input connectors 381, 382, and 383 and to store the received input data in the memory unit 370. Loading the input data into the memory unit 370 allows quick access to relevant data portions by the units of the user interface 300. The input data may comprise, for example, the image data. The memory unit 370 may be implemented by devices such as, but not limited to, a Random Access Memory (RAM) chip, a Read Only Memory (ROM) chip, and/or a hard disk drive and a hard disk. The memory unit 370 may be further arranged to store the output data. The output data may comprise, for example, data for displaying the caliper 21. The memory unit 370 may be also arranged to receive data from and deliver data to the units of the user interface 300 comprising the image unit 310, the deployment unit 320, the scaling unit 330, the translation unit 340, the rotation unit 345, and the caliper unit 350, via a memory bus 375. The memory unit 370 is further arranged to make the output data available to external devices via any of the output connectors 391 and 392. Storing data from the units of the user interface 300 in the memory unit 370 may advantageously improve performance of the units of the user interface 300 as well as the rate of transfer of the output data from the units of the user interface 300 to external devices.

Alternatively, the user interface 300 may comprise no memory unit 370 and no memory bus 375. The input data used by the user interface 300 may be supplied by at least one external device, such as an external memory or a processor, connected to the units of the user interface 300. Similarly, the output data produced by the user interface 300 may be supplied to at least one external device, such as an external memory or a processor, connected to the units of the user interface 300. The units of the user interface 300 may be arranged to receive the data from each other via internal connections or via a data bus.

The image unit 310 of the user interface 300 is arranged for visualizing the image data in the image for displaying on a display. The tasks to be performed by the image unit 310 include, for example, determining a viewport for displaying the image. The skilled person will know typical functions, which can be implemented in embodiments of the image unit 310.

There are many ways of computing a view of a 3D region of image data space. The view may be computed using, for example, maximum intensity projection (MIP), iso-surface projection (ISP), and direct volume rendering (DVR). In MIP, a 3D location of maximum intensity along a projection ray is found. The ray is cast from a viewing plane. The intensity value of the pixel on the viewing plane may be set to the found maximum intensity value along the ray. In ISP, projection rays are terminated when they cross the iso-surface of interest. The iso-surface is defined as the level set of the intensity function, i.e. as the set of all voxels having the same intensity value. More information on MIP and ISP can be found in a book by Barthold Lichtenbelt, Randy Crane, and Shaz Naqvi, entitled "Introduction to Volume Rendering", published by Hewlett-Packard Professional Books, Prentice Hall; Bk&CD-Rom edition (1998). In DVR, a transfer function assigns a renderable property, such as opacity, to intensity values comprised in the image data. An implementation of DVR is described in an article by T. He et al. entitled "Generation of Transfer Functions with Stochastic Search Techniques" in Proceedings of IEEE Visualization, pages 227-234, 1996.

Objects such as iso-surfaces may be identified in the image data and may be used to define objects in model coordinate systems of a graphics processor. A graphics pipeline of the graphics processor may be used to compute the view of the objects comprised in the model coordinate systems. The graphics pipeline is described in a book by J. D. Foley et al, entitled "Computer graphics: Principles and practice", $2^{nd}$ Ed., Addison-Wesley, Reading, Mass., USA, 1996.

The skilled person will understand that there are many methods that may be employed for computing a view of a 3D region of image data space from the image data. The choice of the method of computing the view of the 3D region of the image data space does not limit the scope of the claims.

The deployment unit 320 of the user interface 300 is arranged for deploying a caliper 21 in an image data space. The caliper is deployed in a pre-defined location of the image data space or in a location specified by the user. Optionally, the deployment unit 320 may be arranged to receive a user input for specifying a caliper 21 of a plurality of calipers for deployment.

The scaling unit 330 of the user interface 300 is arranged for scaling the caliper 21 by a scaling factor in a direction in the image data space. The scaling unit 330 may be arranged to receive a user input from a user input device, such as a keyboard, a mouse, or a trackball, for example, and compute the size of the caliper 21 on the basis of this user input. The scaling of the caliper 21 may be isotropic or anisotropic. For example, scaling of the caliper 21 defined by the circle shown in FIG. 2 is isotropic. Scaling of a caliper 21 comprising an ellipse may be anisotropic and may occur in the direction of an axis of the ellipse. Scaling of a 3D caliper 21 may occur in a plurality of directions. Optionally, a plurality of scaling factors may be determined, e.g., one scaling factor for each scaling direction. Optionally, the mode of scaling may be selectable and may be determined by the user.

The translation unit 340 of the user interface 300 is arranged for translating the caliper 21 in the image data space. The translation unit 340 may be arranged to receive a user input from a user input device, such as a keyboard, a mouse, or a trackball, for example, and to compute the translated location of the caliper 21 on the basis of this user input. In an embodiment, the translation vectors are substantially parallel to the viewing plane. In another embodiment, translations in all directions in the image data space are implemented. Optionally, the user may also be able to zoom in and out the caliper 21, when a perspective projection technique is used by the image unit 310 to compute the view of the region of the image data space.

The caliper unit 350 of the user interface is arranged for visualizing the caliper 21 in the image. The caliper unit 350 is arranged to obtain data from the deployment unit 320, scaling unit 330, and translation unit 340. Based on this data, the caliper unit 350 is further arranged to compute the image of the caliper 21 in the image data space for visualizing the caliper 21 in the image. Optionally, the caliper unit 350 may be a component of, or may receive data from, the image unit 310 to determine how the caliper should be located in the 3D image data space. For example, the caliper unit 350 may receive the depth value of a pixel displayed at the center of the circle to compute the size of the caliper at this depth in the perspective projection.

In an embodiment, the user interface 300 comprises a rotation unit 345 for rotating the caliper 21 in the image data space. Any number of rotation axes may be used by the rotation unit 345. For each rotation, a rotation axis and/or angle are determined by the user, and user input data specifying the rotation axis and/or angle is obtained by the rotation unit 345. A rotation axis may be one of the three Cartesian axes of a reference system in the image data space. Alternatively, a rotation axis may be an axis of the caliper. The caliper unit 350 may be arranged to obtain data from the rotation unit 345. Based on this data, the caliper unit 350 may be further arranged to compute the image of the rotated caliper 21 in the image data space for visualizing the caliper 21 in the image.

Figure 4:
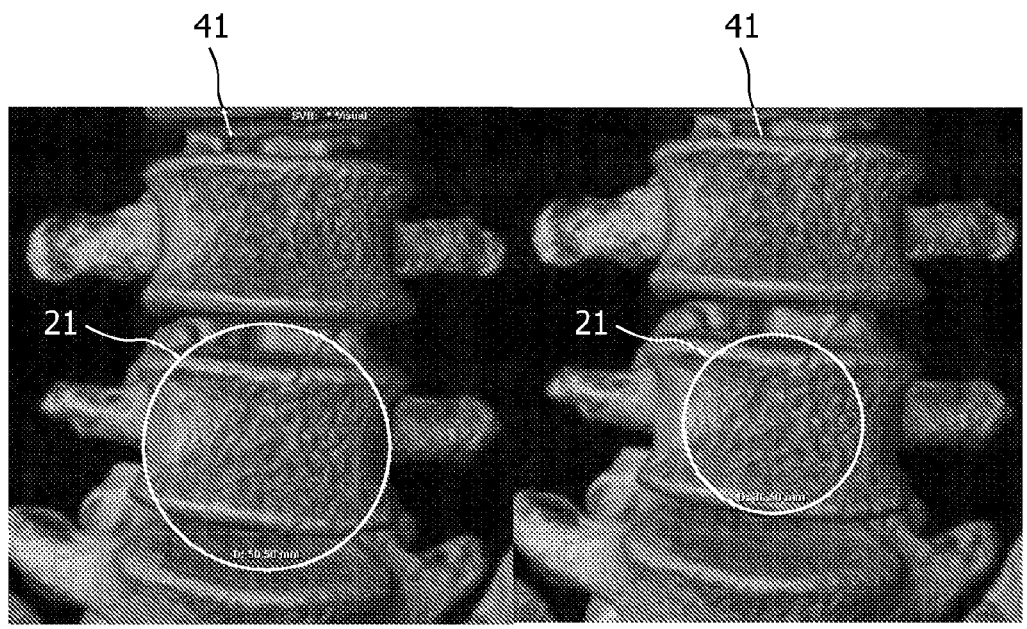
FIG. 4 illustrates multiple measurements of the same object.

FIG. 4 illustrates multiple measurements of the same object—vertebra 41. Using the caliper 21 the user may easily measure various parameters of the vertebrae 41.

Figure 5:
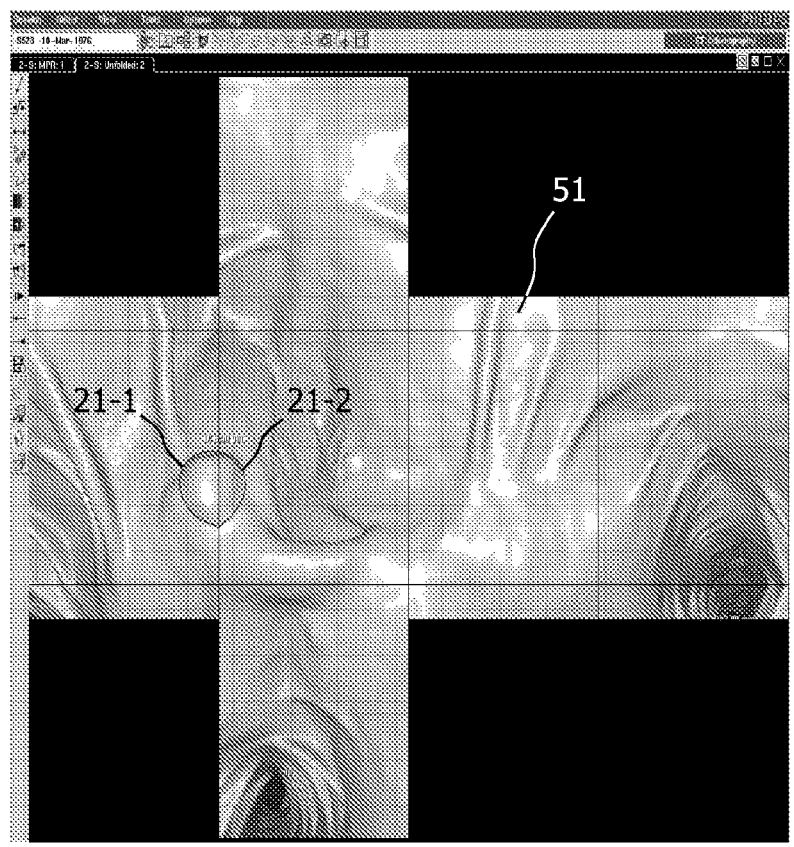
FIG. 5 illustrates using a caliper for measuring the diameter of the base of a colon polyp.

FIG. 5 illustrates using a caliper for measuring the diameter of the base of a colon polyp. The caliper visualization is performed in an unfolded cube projection 51 with strong perspective deformation. FIG. 5 shows that the implementation of the caliper properly describes images with perspective projections. The size of the caliper parts 21-1 and 21-2 changes at different depths. The shape of the circular caliper needs to deform accordingly. Thus, the projection of the caliper in a perspective is not a circle. This feature is very useful for virtual colonoscopy users.

Figure 6:
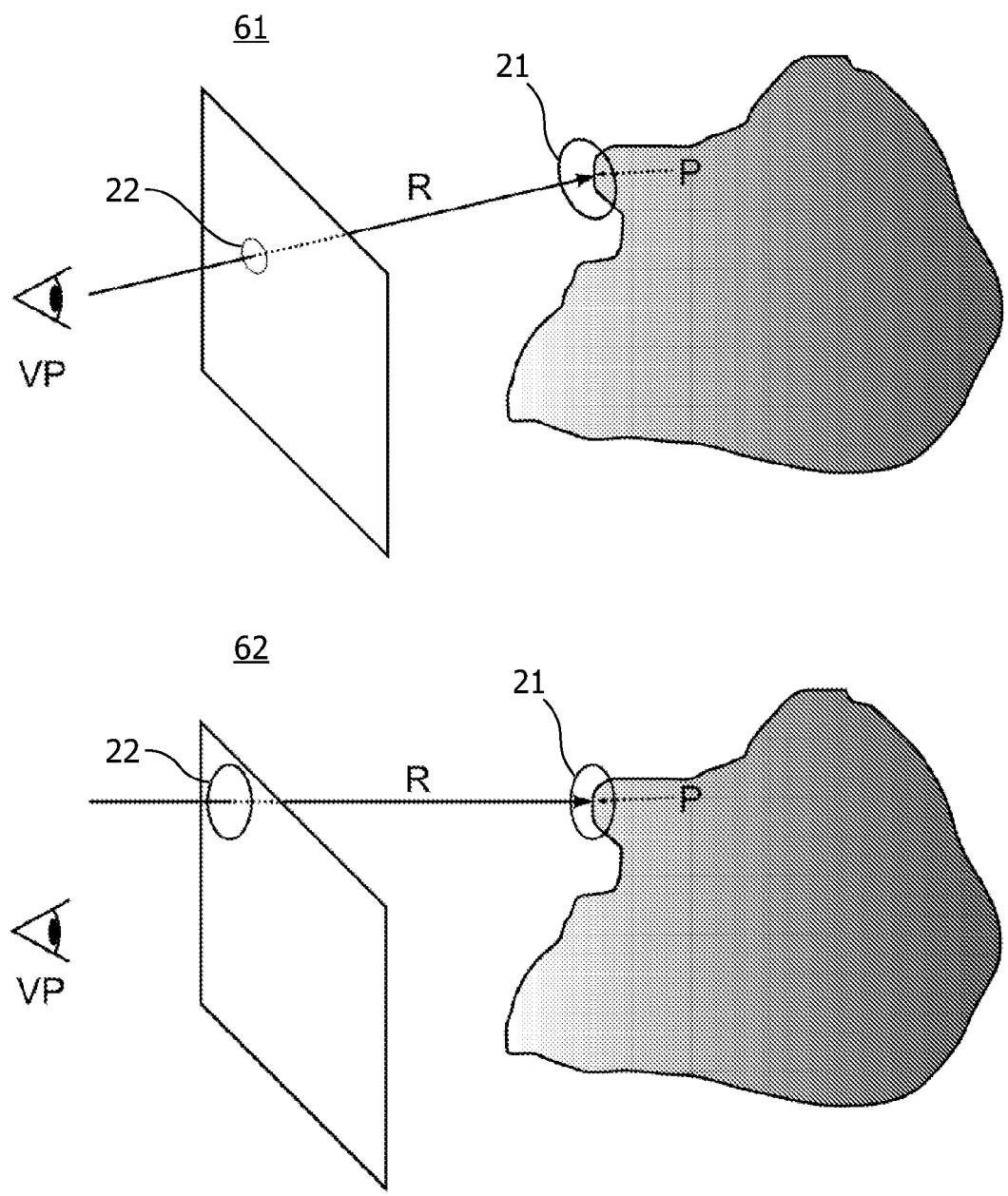
FIG. 6 schematically illustrates an implementation of the circular caliper in the perspective and parallel projections.

FIG. 6 schematically illustrates an implementation of the circular caliper 21 in a perspective and parallel projection. Given a 2D location in the viewing plane, typically the location of the mouse pointer, a 3D location P in the image data space is determined by the image unit 310, for example. The 2D location represents the center of the circle of an image 22 of the circular caliper 21. For a perspective projection, shown in the top image 61, the actual radius of the circle 22 for displaying on a display is determined based on the 3D location P, namely, based on the distance of the 3D location P from the viewer position point VP. For an orthographic projection, the radius of the actual circle 21 is identical to the radius of the displayed circle 22, irrespective of the 3D location P.

The skilled person will understand that other embodiments of the user interface 300 are also possible. It is possible, among other things, to redefine the units of the user interface 300 and to redistribute their functions. Although the described embodiments apply to medical images, other applications of the user interface 300, outside the medical domain, are also possible.

The skilled person will further recognize that the user interface 300 described in the current document may be a valuable tool for assisting a physician in many aspects of her/his job.

The units of the user interface 300 may be implemented using a processor. Normally, their functions are performed under the control of a software program product. During the execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 7:
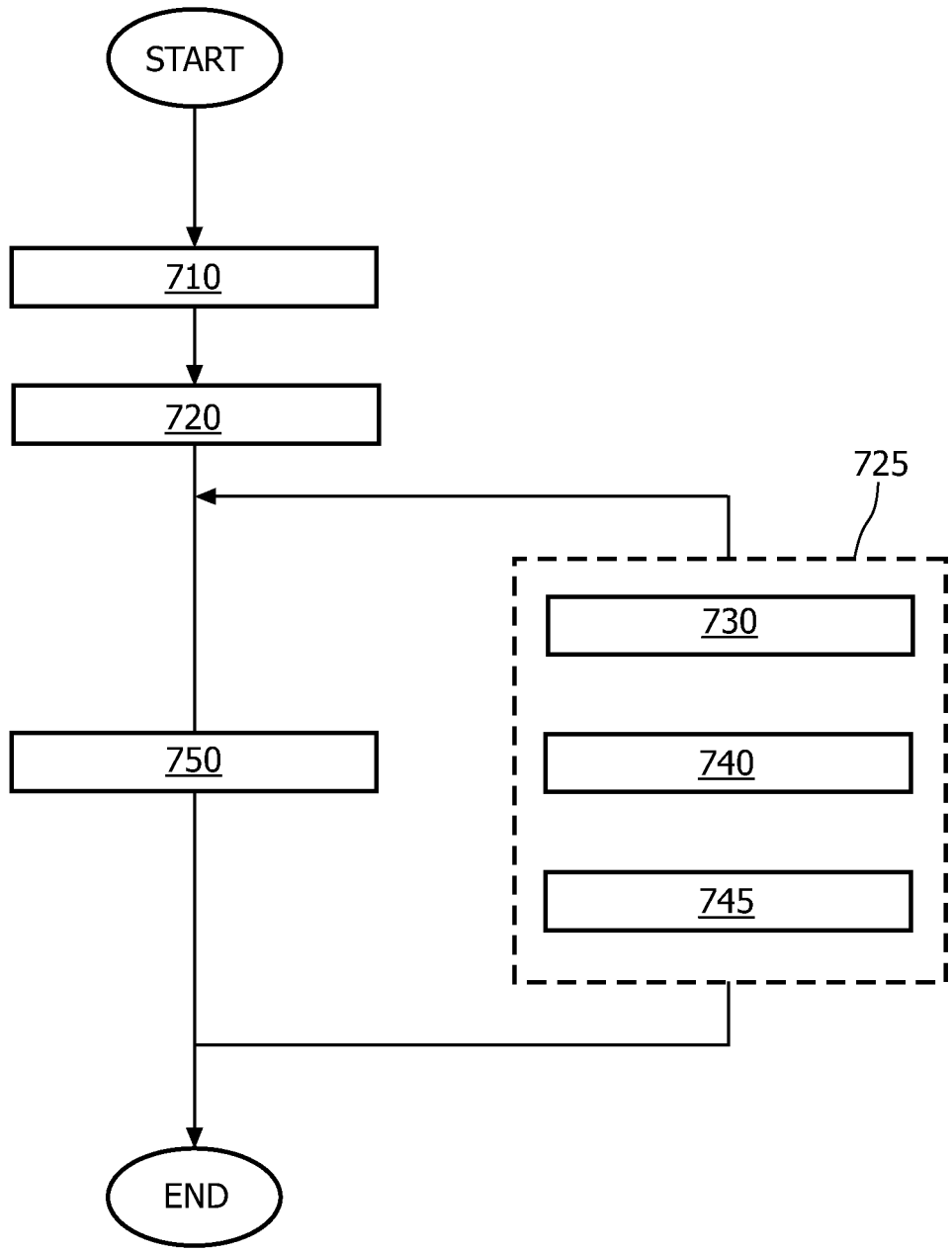
FIG. 7 shows a flowchart of an exemplary implementation of the method.

FIG. 7 shows a flowchart of an exemplary implementation of the method 700 of measuring an object viewed in an image computed from image data. The method 700 begins with an image step 710 for visualizing the image data in the image. After the image step 710, the method 700 continues to a deployment step 720 for deploying a caliper 21 in an image data space. After the deployment step 720, the method 700 continues to a caliper step 750 for visualizing the caliper 21 in the image. After the caliper step, the method 700 allows the user to manipulate the caliper. This is achieved in a manipulation step 725 comprising a scaling step 730 for scaling the caliper 21 by a scaling factor in a direction in the image data space, a translation step 740 for translating the caliper 21 in the image data space, and a rotation step 745 for rotating the caliper 21 in the image data space. After the manipulation step 725, the method 700 continues to the caliper step 750. After the caliper step 750, the method 700 returns to the manipulation step 725 for more manipulation of the caliper in the image data space, or terminates. The caliper 21 of the method 700 comprises a knot for measuring the object. The object is measured based on the scaling factor used for scaling the caliper.

The skilled person may change the order of some steps or perform some steps concurrently using threading models, multi-processor systems or multiple processes without departing from the concept as intended by the present invention. Optionally, two or more steps of the method 700 of the current invention may be combined into one step. Optionally, a step of the method 700 of the current invention may be split into a plurality of steps.

Figure 8:
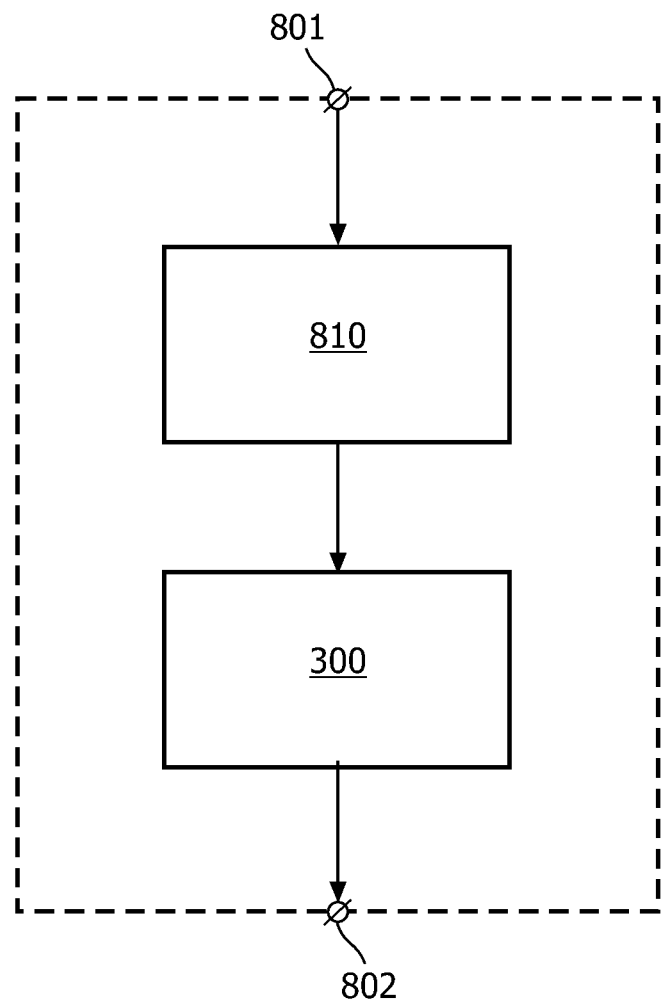
FIG. 8 schematically shows an exemplary embodiment of the image acquisition apparatus.

FIG. 8 schematically shows an exemplary embodiment of the image acquisition apparatus 800 employing the user interface 300, said image acquisition apparatus 800 comprising a CT image acquisition unit 810 connected via an internal connection with the user interface 300, an input connector 801, and an output connector 802. This arrangement advantageously increases the capabilities of the image acquisition apparatus 800, providing said image acquisition apparatus 800 with advantageous capabilities of the user interface 300.

Figure 9:
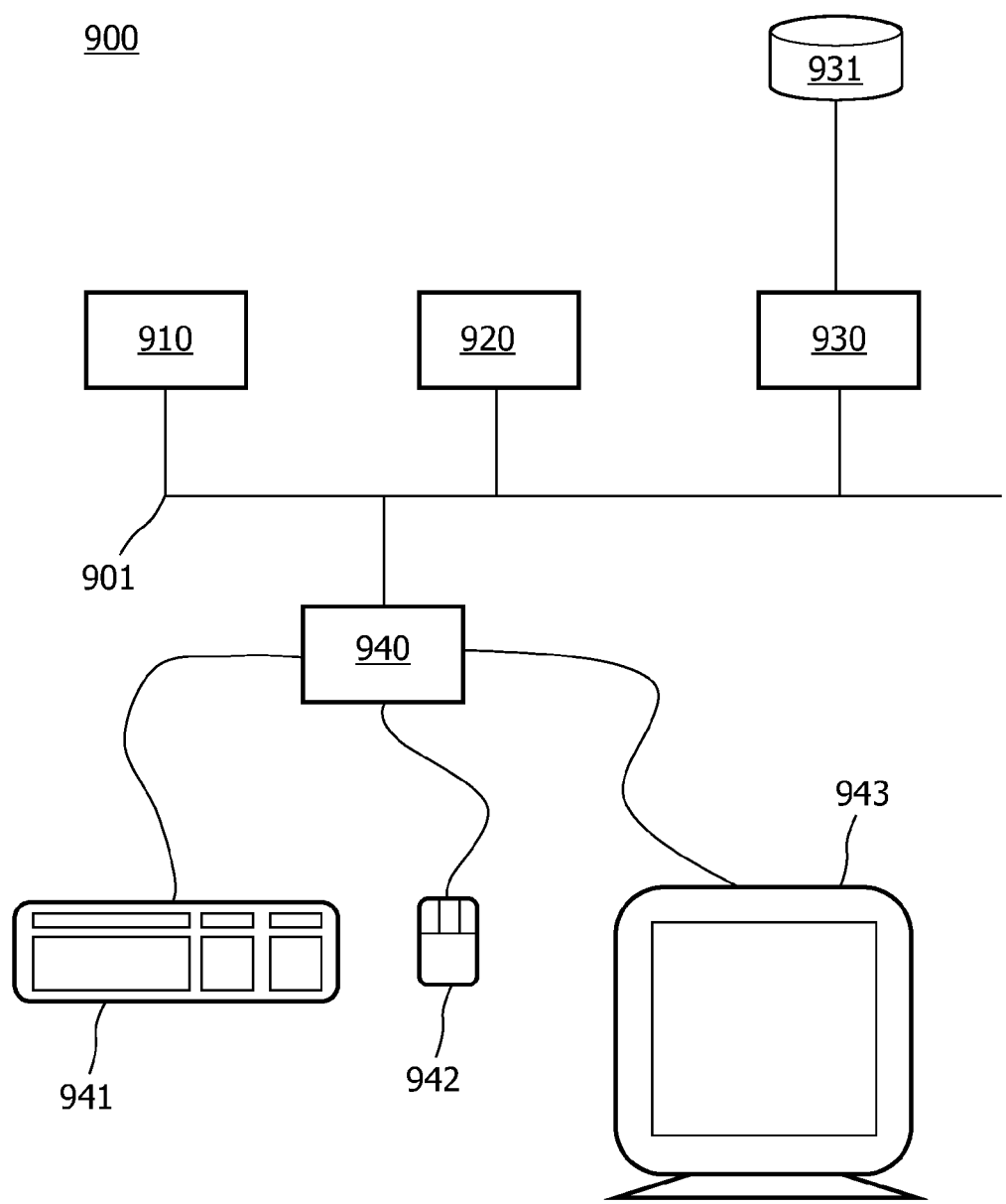
FIG. 9 schematically shows an exemplary embodiment of the workstation.

FIG. 9 schematically shows an exemplary embodiment of the workstation 900. The workstation comprises a second user interface bus 901. A processor 910, a memory 920, a disk input/output (I/O) adapter 930, and a second user interface (UI) 940 are operatively connected to the second user interface bus 901. A disk storage device 931 is operatively coupled to the disk I/O adapter 930. A keyboard 941, a mouse 942, and a display 943 are operatively coupled to the UI 940. The user interface 300 of the invention, implemented as a computer program, is stored in the disk storage device 931. The workstation 900 is arranged to load the program and input data into memory 920 and execute the program on the processor 910. The user can input information to the workstation 900 using the keyboard 941 and/or the mouse 942. The workstation is arranged to output information to the display device 943 and/or to the disk 931. The skilled person will understand that there are numerous other embodiments of the workstation 900 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the user interface claims enumerating several units, several of these units can be embodied by one and the same item of hardware or software. The usage of the words first, second and third, etc., does not indicate any ordering. These words are to be interpreted as names.

The invention claimed is:

1. A user interface executed by a processor for measuring an object viewed in an image computed from 3D image data, the user interface comprising:
    an image unit for visualizing the 3D image data in a 2D projection of the 3D image data for displaying on a display;
    a deployment unit for deploying a caliper comprising a knot for measuring the object in an image data space;
    a scaling unit for scaling the deployed caliper, inserted with a previously defined geometry and size into the image data space, by a scaling factor in a direction in the image data space;
    a translation unit for translating the deployed caliper in the image data space;
    a caliper unit for visualizing the deployed caliper in the image; and
    a rotation unit for rotating the deployed caliper in the image data space and obtaining a measurement after the rotation, wherein the rotating is a 3D rotation comprising a fixed center and three degrees of freedom wherein the knot is a trefoil knot and the caliper is a 3D caliper.

2. A user interface as claimed in claim 1, wherein the knot is an unknot and is substantially planar.

3. A user interface as claimed in claim 2, wherein the knot is a circle.

4. A user interface as claimed in claim 1, wherein the image data and the caliper are rendered using the perspective projection method.

5. A user interface as claimed in claim 1, for measuring the diameter of a blood vessel.

6. An image acquisition apparatus comprising a user interface as claimed in claim 1.

7. A workstation comprising a user interface as claimed in claim 1.

8. A method of measuring an object viewed in an image computed from 3D image data, the method comprising:
    an image step for visualizing the 3D image data in a 2D projection of the 3D image data for displaying on a display;
    a deployment step for deploying a caliper comprising a knot for measuring the object in an image data space;
    a scaling step for scaling the deployed caliper, inserted with a previously defined geometry and size into the image data space, by a scaling factor in a direction in the image data space;
    a translation step for translating the deployed caliper in the image data space;
    a caliper step for visualizing the deployed caliper in the image; and
    a rotation step for rotating the deployed caliper in the image data space and obtaining a measurement after the rotation, wherein the rotating is a 3D rotation comprising a fixed center and three degrees of freedom.

9. A computer program product embodied on a non-transitory computer-readable medium to be loaded by a computer arrangement, comprising instructions for measuring an object viewed in an image computed from 3D image data, the computer arrangement comprising a processing unit and a memory, the computer program product, after being loaded, providing said processing unit with the capability to carry out the tasks of:
- visualizing the 3D image data in a 2D projection of the 3D image data for displaying on a display;
- deploying a caliper comprising a knot for measuring the object in an image data space;
- scaling the deployed caliper, inserted with a previously defined geometry and size into the image data space, by a scaling factor in a direction in the image data space;
- translating the deployed caliper in the image data space;
- visualizing the deployed caliper in the image; and
- rotating the deployed caliper in the image data space and obtaining a measurement after the rotation, wherein the rotating is a 3D rotation comprising a fixed center and three degrees of freedom wherein the knot is a trefoil knot and the caliper is a 3D caliper.

10. A user interface as claimed in claim 1, wherein the scaling unit scales the deployed caliper about a user-defined scaling center.

11. The user interface as claimed in claim 1, wherein the deployed caliper comprises two concentric circles of different radii.

12. The user interface as claimed in claim 1, wherein the scaling occurs in a plurality of dimensions and a scaling factor is determined for each direction.

* * * * *